US009326308B2

(12) United States Patent
Okamoto (10) Patent No.: US 9,326,308 B2
(45) Date of Patent: Apr. 26, 2016

(54) PAIRING METHOD AND TERMINAL APPARATUS

(71) Applicant: Panasonic Intellectual Property Management Co., Ltd., Osaka (JP)

(72) Inventor: Keiji Okamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/734,002

(22) Filed: Jun. 9, 2015

(65) Prior Publication Data

US 2015/0373761 A1    Dec. 24, 2015

(30) Foreign Application Priority Data

Jun. 18, 2014   (JP) ................................ 2014-124949

(51) Int. Cl.
| | | |
|---|---|---|
| *H04B 7/00* | (2006.01) | |
| *H04W 76/02* | (2009.01) | |
| *H04W 12/04* | (2009.01) | |
| *H04L 29/08* | (2006.01) | |

(52) U.S. Cl.
CPC ............. *H04W 76/023* (2013.01); *H04L 67/12* (2013.01); *H04W 12/04* (2013.01)

(58) Field of Classification Search
CPC ..... H04W 76/023; H04W 12/04; H04L 67/12
USPC ........................................................ 455/41.2
See application file for complete search history.

(56) References Cited

U.S. PATENT DOCUMENTS

| | | | | |
|---|---|---|---|---|
| 7,788,494 B2* | 8/2010 | Aissi ..................... | H04L 9/0825 | |
| | | | | 380/283 |
| 8,103,247 B2* | 1/2012 | Ananthanarayanan | H04W 12/04 | |
| | | | | 455/410 |
| 8,406,735 B2* | 3/2013 | Bertoni ................. | H04L 9/0841 | |
| | | | | 380/255 |
| 8,542,834 B1* | 9/2013 | Feikis ..................... | H04L 63/18 | |
| | | | | 375/140 |
| 9,052,876 B2* | 6/2015 | Willins ................. | H04L 63/107 | |
| 9,210,357 B1* | 12/2015 | Dong .................... | H04N 5/4403 | |
| 2006/0224893 A1* | 10/2006 | Sales ......................... | H04L 9/32 | |
| | | | | 713/171 |
| 2008/0320587 A1* | 12/2008 | Vauclair ................. | H04L 41/28 | |
| | | | | 726/17 |

(Continued)

FOREIGN PATENT DOCUMENTS

| | | |
|---|---|---|
| JP | 11-234208 | 8/1999 |
| JP | 2007-166033 | 6/2007 |

(Continued)

*Primary Examiner* — April G Gonzales
(74) *Attorney, Agent, or Firm* — Wenderoth, Lind & Ponack, L.L.P.

(57) ABSTRACT

In a wireless communication system which includes a first electronic device, a second electronic device, and a plurality of third electronic devices, a pairing method of pairing the second electronic device and a particular third electronic device, includes a step in which the first electronic device receives a plurality of pass keys from part or all of the plurality of third electronic devices, a step in which the first electronic device identifies that a pass key of the particular third electronic device is included in the plurality of pass keys using identification information, a step of transmitting the pass key of the particular third electronic device to the second electronic device, a step in which the second electronic device transmits the pass key of the second electronic device to the particular third electronic device, and a step of establishing connection between the second and third electronic devices.

14 Claims, 8 Drawing Sheets

(56) References Cited

U.S. PATENT DOCUMENTS

2013/0120251 A1* 5/2013 Lee ................... G06F 3/1438
                                                    345/157
2013/0212233 A1* 8/2013 Landry ............... H04M 1/7253
                                                    709/220

FOREIGN PATENT DOCUMENTS

| JP | 2009-034868 | 2/2009 |
|----|-------------|--------|
| JP | 2011-109498 | 6/2011 |

* cited by examiner

PAIRING METHOD AND TERMINAL APPARATUS

BACKGROUND

1. Field

The present disclosure relates to a pairing technique for performing communication between a plurality of terminal apparatuses.

2. Description of the Related Art

Bluetooth (registered trademark which is likewise applied below) standards require that pairing is performed when a plurality of terminal apparatuses perform communication. Pairing mainly refers to setting connection for performing wireless communication between a plurality of terminal apparatuses.

Now, a procedure of pairing two electronic devices according to the Bluetooth standards will be described. The two electronic devices are, for example, a mobile telephone and a headphone.

First, one electronic device searches for another electronic device in a range which radio waves reach. A user selects an electronic device (headphone) which the user wants to communicate with, from searched electronic devices, and inputs the same pass key to both of the electronic devices. The pass key is also referred to as a PIN code, and usually has at least four digits. If the pass keys match, the two electronic devices authenticate each other, and then are paired.

The electronic device corresponding to the headphone can additionally establish pairing with another electronic device, and communicate with another electronic device. However, pairing the electronic device with another electronic device requires the user to input a new pass key, and therefore is burdensome for the user.

Unexamined Japanese Patent Publication No. 2011-109498 discloses a technique of authenticating pairing by directly connecting two wireless communication terminals which perform near field wireless communication, through contact terminals, and transmitting and receiving information through these contact terminals.

SUMMARY

A method according to an exemplary embodiment of the present disclosure is a pairing method of, in a wireless communication system including a first electronic device, a second electronic device and a plurality of third electronic devices, pairing the second electronic device and a particular one of the third electronic devices, the devices each having a wireless communication function. The first electronic device holds identification information for identifying the particular third electronic device. The second electronic device and each of the third electronic devices hold pass keys for uniquely specifying the second electronic device and each of the third electronic devices. This pairing method includes a step (a) in which the first electronic device receives a plurality of pass keys from part or all of the plurality of third electronic devices, a step (b) in which the first electronic device identifies that a pass key of the particular third electronic device is included in the plurality of pass keys using the identification information, a step (c) of transmitting the pass key of the particular third electronic device to the second electronic device, a step (d) in which the second electronic device transmits the pass key of the second electronic device to the particular third electronic device, and a step (e) of establishing connection between the second electronic device and the particular third electronic device.

DETAILED DESCRIPTION OF THE PREFERRED EMBODIMENT

Exemplary embodiments will be described in detail below with reference to the drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

It should be noted that, the inventor(s) provide the accompanying drawings and the following description to allow one of ordinary skill in the art to sufficiently understand the exemplary embodiments of the present disclosure, and do not intend to limit the subject matters recited in the claims by the accompanying drawings and the following description.

First Exemplary Embodiment

An exemplary embodiment which is an aspect of the present disclosure will be described below with reference to the accompanying drawings.

Three types of electronic devices (a first electronic device, a second electronic device, and third electronic devices)

which perform communication based on the Bluetooth standards will be assumed as the exemplary embodiment of the present disclosure. For example, the first electronic device is a portable terminal apparatus such as a mobile telephone or a smartphone. The second electronic device is a headphone. The third electronic device is an information terminal apparatus which is disposed in a back of a seat in an airplane and which a passenger uses to enjoy a movie, music or the like.

In the following description, the first electronic device will be referred to as an "information terminal" or a "portable terminal apparatus" or simply as a "portable terminal". Further, the second electronic device will be also referred to as a "BT device". Furthermore, the third electronic device will be referred to as a "seat terminal apparatus" or simply as a "seat terminal". Unless otherwise particularly stated, a particular user uses each one of the first electronic device and the second electronic device in the airplane. Further, there are a plurality of seat terminals in the airplane.

It should be noted that, the assumption is an example. A method other than the Bluetooth standards may be used for a communication method. Further, portable terminals do not exclude devices other than mobile telephones and smartphones, and electronic devices other than headphones may be used. Furthermore, a seat terminal does not necessarily need to be provided in association with a seat. The exemplary embodiment of the present disclosure is not limited to an example carried out in an airplane.

[1-1. Configuration]
[1-1-1. Entire Configuration]

Figure 1:
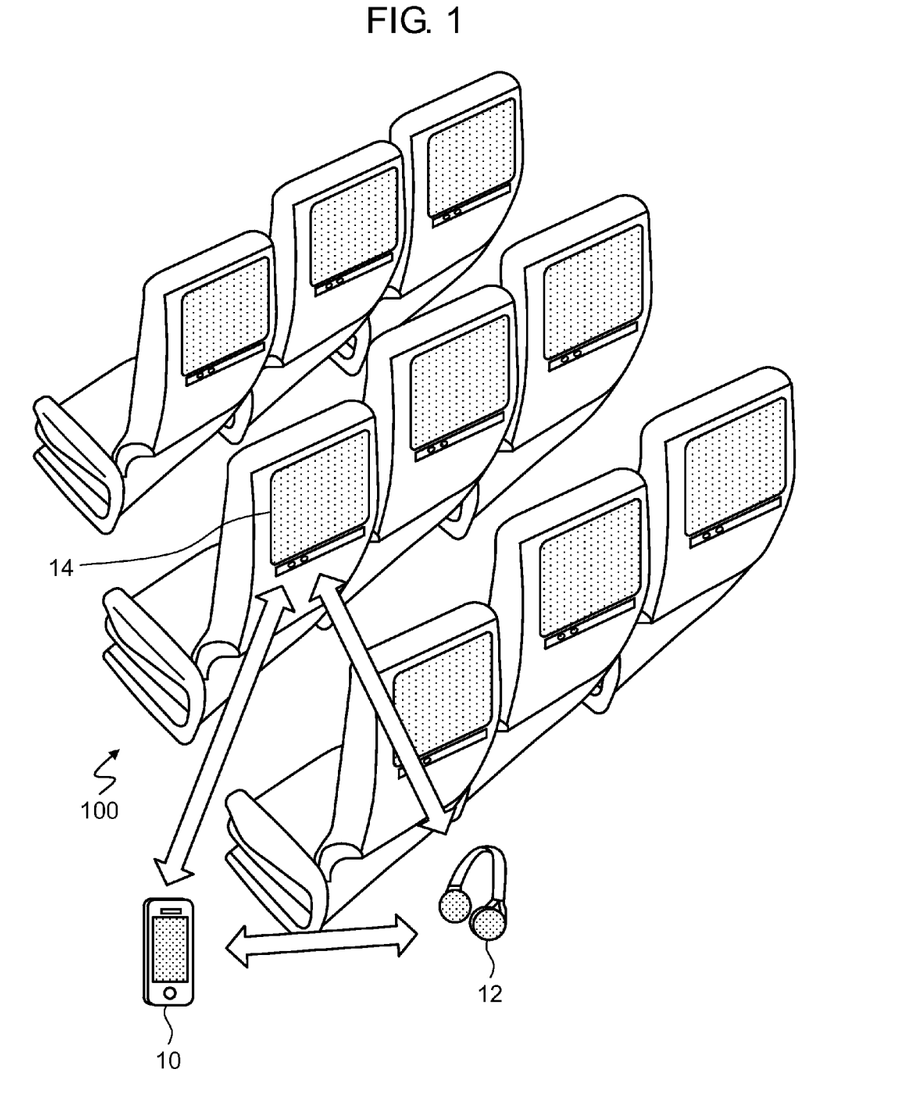
FIG. 1 illustrates a schematic configuration of wireless communication system 100 provided in an airplane.

FIG. 1 illustrates a schematic configuration of wireless communication system 100 provided in an airplane.

Wireless communication system 100 includes portable terminal 10, BT device 12 and a plurality of seat terminals including seat terminals 14. Portable terminal 10 is an electronic device which a user who is a passenger possesses. BT device 12 is also a device which the user possesses. It should be noted that, BT device 12 may be a headphone lent to the user in an airplane from an airline company. In the present exemplary embodiment, it is assumed that portable terminal 10 and BT device 12 are devices which the user possesses and carries in the airplane. It should be noted that, for ease of description, portable terminal 10 and BT device 12 are not paired yet. An operation under conditions that pairing is performed will be described later with reference to FIGS. 8 and 9.

Wireless communication system 100 according to the present exemplary embodiment can pair BT device 12 and seat terminal 14 even though the user does not input each pass key to BT device 12 and seat terminal 14. The user starts pairing BT device 12 and seat terminal 14 by, for example, operating portable terminal 10. BT device 12 and seat terminal 14 transmit and receive unique pass keys required for authentication, between themselves through portable terminal 10. As a result, pairing is established between BT device 12 and seat terminal 14 while security is secured. The user can enjoy audio such as a movie and music provided by seat terminal 14 by using BT device 12.

The operation procedure will be more specifically described as in following (a) to (e). As described above, the following operation is started when the user instructs pairing processing by operating portable terminal 10.

(a) Portable terminal 10 receives a plurality of pass keys from part (including seat terminal 14) or all of a plurality of seat terminals.

(b) Portable terminal 10 identifies that a pass key of a particular seat terminal (seat terminal 14) is included in a plurality of pass keys using the identification information.

(c) Portable terminal 10 transmits the pass key of seat terminal 14 to BT device 12.

(d) BT device 12 transmits the pass key of BT device 12 to seat terminal 14.

(e) Connection (pairing) between BT device 12 and seat terminal 14 is established.

It should be noted that, a device having a function of performing communication generally includes information for uniquely identifying the device on a communication network. That is, portable terminal 10, BT device 12, and each of seat terminals 14 hold pass keys for uniquely specifying portable terminal 10, BT device 12 and each seat terminal 14 upon communication based on the Bluetooth method.

The "identification information" is information required to uniquely identify particular seat terminal 14 from among a plurality of seat terminals. The identification information is typically a table which associates information (seat position information) for specifying a seat position in the airplane with a pass key of a seat terminal at each seat position.

An example of this seat position information is a seat number of the user. The user installs an application provided from, for example, an airline company, to portable terminal 10 in advance. In the application, the table which associates seat numbers (seat position information) in the airplane with pass keys of seat terminals is incorporated. Portable terminal 10 operates to obtain a pass key of seat terminal 14 corresponding to a user's seat from a user's seat number, and pair seat terminal 14 which has sent this pass key, and BT device 12. It should be noted that, identification information only needs to include the pass key of the seat terminal corresponding to at least the user's seat number. The identification information does not need to include pass keys of seat terminals corresponding to all seat numbers.

Configurations of portable terminal 10, BT device 12 and seat terminal 14 will be described below prior to description of details of an operation of wireless communication system 100 illustrated in FIG. 1.

[1-1-2. Configuration of Portable Terminal 10]

Figure 2:
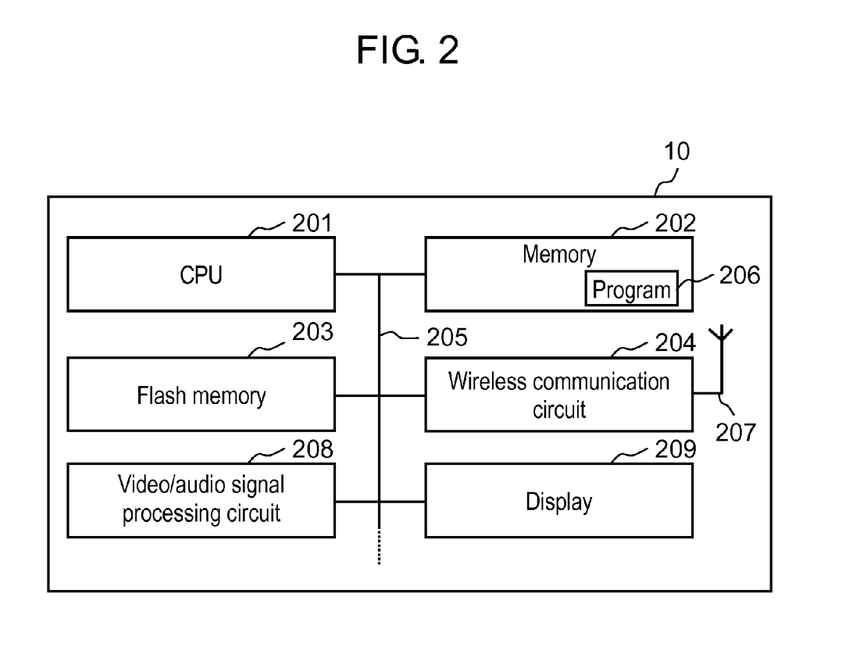
FIG. 2 illustrates a hardware configuration of portable terminal 10.

FIG. 2 illustrates a hardware configuration of portable terminal 10.

Portable terminal 10 includes CPU (Central Processing Unit) 201, memory (RAM (Random Access Memory)) 202, flash memory 203, wireless communication circuit 204, bus 205, display 209, antenna 207 and video/audio signal processing circuit 208. The components of portable terminal 10 are connected to enable communication between the components through bus 205.

CPU 201 is a signal processing circuit which controls an entire operation of portable terminal 10. In the present description, CPU 201 is also referred to as an arithmetic circuit or a control circuit. CPU 201 communicates with BT device 12 and seat terminal 14 and performs processing related to FIGS. 5 and 6 described later, and pairs BT device 12 and seat terminal 14. This processing is realized when, for example, CPU 201 executes computer program 206 stored in memory 202. Flash memory 203 is a storage device which holds various items of data such as obtained movie data and audio data. Flash memory 203 may store computer program 206.

Computer program 206 holds identification information for identifying particular seat terminal 14. Table 1 illustrates an example of the identification information.

TABLE 1

| Seat number | Pass key of each seat terminal 14 |
|---|---|
| 1A | 1011 |
| 1C | 1012 |
| 1D | 1013 |
| ... | ... |
| 58A | 1070 |
| 58C | 1071 |
| ... | ... |
| 58K | 1078 |

In the present exemplary embodiment, the identification information is a table which associates information (seat position information) for specifying a seat position in the airplane with a pass key of a seat terminal at each seat position. The identification information is used to specify seat terminal 14 corresponding to a user's seat from among a plurality of seat terminals. It should be noted that, as described above, the identification information may include information of only seat terminal 14 corresponding to the user's seat.

Portable terminal 10 has a communication function based on the Bluetooth standards. Wireless communication circuit 204 performs communication processing based on the Bluetooth standards using antenna 207. Wireless communication circuit 204 feeds predetermined reception power and transmission power to antenna 207 using power of a battery (not illustrated), and transmits and receives data by way of wireless communication. The description has been given of the case where wireless communication circuit 204 performs both of transmission and reception. However, an operation of wireless communication circuit 204 is realized by a transmission circuit and a reception circuit connected to antenna 207. It should be noted that, portable terminal 10 may have a communication function based on communication standards (e.g. Wi-Fi standards) other than the Bluetooth standards.

Video/audio signal processing circuit 208 is a circuit which processes signals of video which needs to be displayed on display 209 and audio which needs to be output from a speaker (not illustrated). It should be noted that, video/audio signal processing circuit 208 may be divided into a video dedicated circuit and an audio dedicated circuit.

Display 209 is a display apparatus which displays video. Like a smartphone, display 209 may be provided with a touch screen panel, and be configured to allow the user to touch a display position and make an input.

[1-1-3. Configuration of BT device 12]

Figure 3:
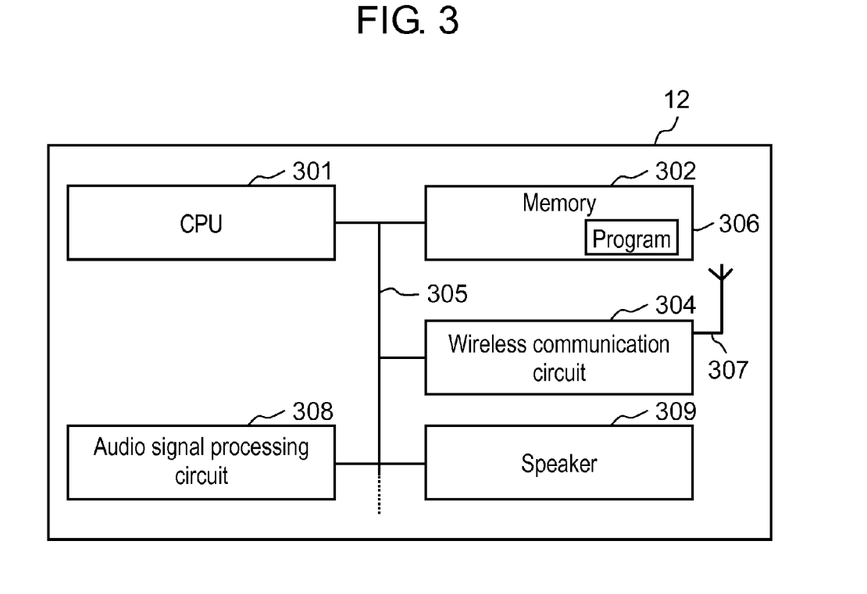
FIG. 3 illustrates a hardware configuration of BT (Bluetooth) device 12.

FIG. 3 illustrates a hardware configuration of BT device 12.

BT device 12 includes CPU 301, memory (RAM) 302, wireless communication circuit 304, bus 305, speaker 309, antenna 307, and audio signal processing circuit 308. The components of BT device 12 are connected to enable communication between the components through bus 305.

CPU 301 is a signal processing circuit which controls an entire operation of BT device 12. In the present description, CPU 301 is also referred to as an arithmetic circuit or a control circuit. CPU 301 communicates with portable terminal 10 and seat terminal 14 and performs processing related to FIGS. 5 and 6 described later, and pairs BT device 12 and seat terminal 14. This processing is realized when, for example, CPU 301 executes computer program 306 stored in memory 302. It should be noted that, BT device 12 may additionally include a ROM (Read Only Memory) (not illustrated) which stores computer program 306.

BT device 12 has a communication function based on the Bluetooth standards. Wireless communication circuit 304 performs communication processing based on the Bluetooth standards using antenna 307. Wireless communication circuit 304 feeds predetermined reception power and transmission power to antenna 307 using power of a battery (not illustrated), and transmits and receives data by way of wireless communication. The description has been given of the case where wireless communication circuit 304 performs both of transmission and reception. However, an operation of wireless communication circuit 304 is realized by a transmission circuit and a reception circuit connected to antenna 307. It should be noted that, BT device 12 may have a communication function based on communication standards (e.g. Wi-Fi standards) other than the Bluetooth standards.

Audio signal processing circuit 308 is a circuit which processes signals of audio which need to be output from speaker 309.

Speaker 309 is an apparatus which causes a cone to oscillate by energy of an electrical signal to generate sound waves.

[1-1-4. Configuration of Seat Terminal 14]

Figure 4:
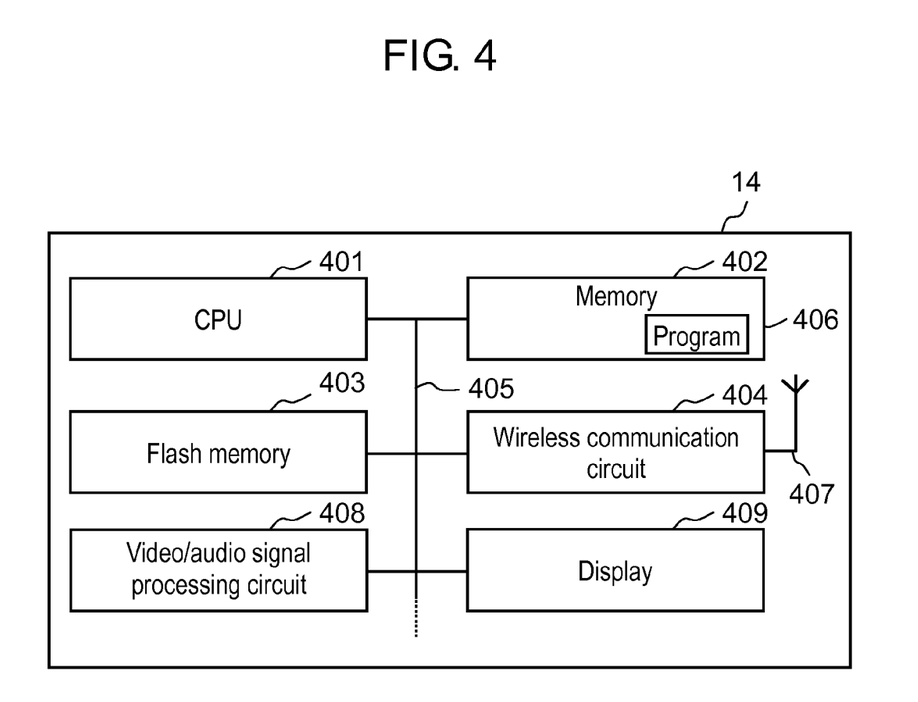
FIG. 4 illustrates a hardware configuration of seat terminal 14.

FIG. 4 illustrates a hardware configuration of seat terminal 14.

Seat terminal 14 includes CPU 401, memory (RAM) 402, flash memory 403, wireless communication circuit 404, bus 405, display 409, antenna 407, and video/audio signal processing circuit 408. The components of seat terminal 14 are connected to enable communication between the components through bus 405.

CPU 401 is a signal processing circuit which controls an entire operation of seat terminal 14. In the present description, CPU 401 is also referred to as an arithmetic circuit or a control circuit. CPU 401 communicates with portable terminal 10 and BT device 12 and performs processing related to FIGS. 5 and 6 described later, and pairs seat terminal 14 and BT device 12. This processing is realized when, for example, CPU 401 executes computer program 406 stored in memory 402. Flash memory 403 stores video data and audio data. It should be noted that, flash memory 403 may further store computer program 406, or may additionally include a ROM (not illustrated) which stores computer program 406.

Seat terminal 14 has a communication function based on the Bluetooth standards. Wireless communication circuit 404 performs communication processing based on the Bluetooth standards using antenna 407. Wireless communication circuit 404 feeds predetermined reception power and transmission power to antenna 407 using power of a battery (not illustrated) of the airplane, and transmits and receives data by way of wireless communication. The description has been given of the case where wireless communication circuit 404 performs both of transmission and reception. However, an operation of wireless communication circuit 404 is realized by a transmission circuit and a reception circuit, which are both connected to antenna 407. It should be noted that, seat terminal 14 may have a communication function based on communication standards (e.g. Wi-Fi standards) other than the Bluetooth standards.

Video/audio signal processing circuit 408 is a circuit which processes signals of video which needs to be displayed on display 409 and audio which needs to be output from a speaker (not illustrated). It should be noted that, video/audio signal processing circuit 408 may be divided into a video dedicated circuit and an audio dedicated circuit.

Display 409 is a display apparatus which displays video. Like a smartphone, display 409 may be provided with a touch screen panel, and be configured to allow the user to touch a display position and make an input. Further, display 409 may be provided with an input apparatus such as buttons.

[1-2. Operation]

Figure 5:
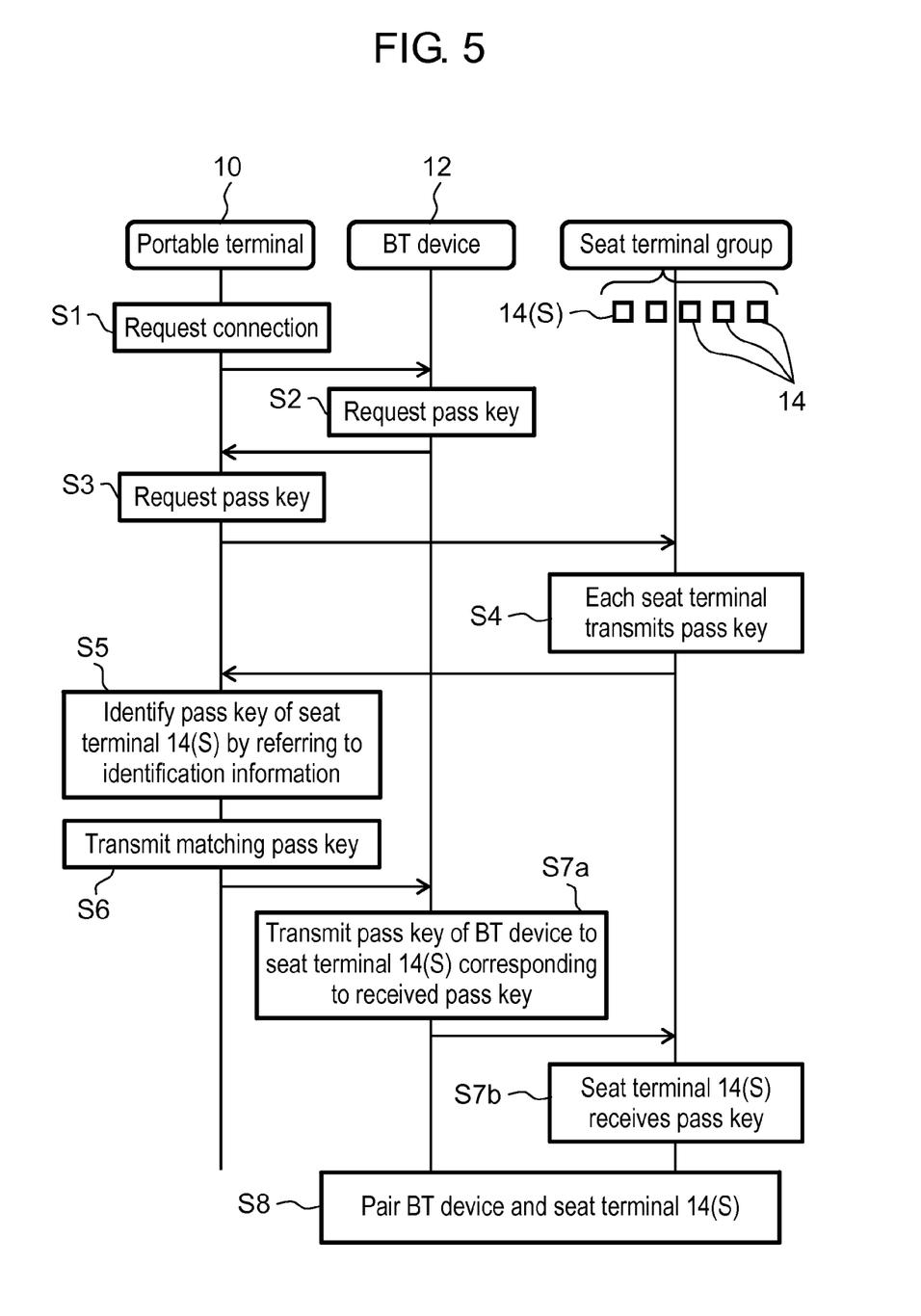
FIG. 5 illustrates a procedure of communication performed between portable terminal 10, BT device 12, and a plurality of seat terminals 14.
Figure 6:
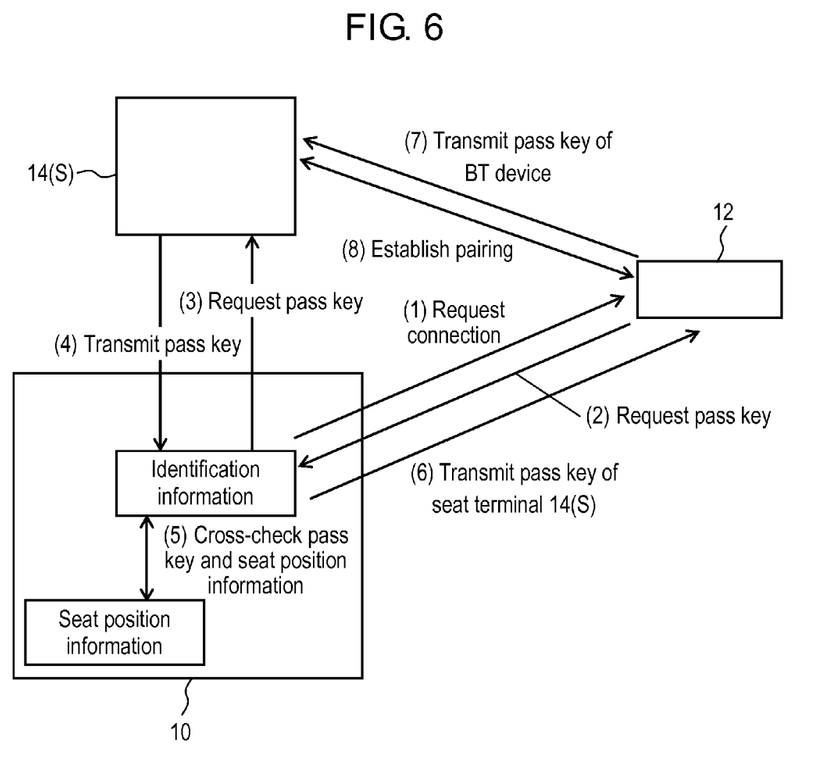
FIG. 6 illustrates a communication procedure focusing upon particular seat terminal 14(S)

FIG. 5 illustrates a procedure of communication performed between portable terminal 10, BT device 12, and a plurality of seat terminals 14. It is assumed that BT device 12 establishes pairing with particular seat terminal 14(S) among a plurality of seat terminals 14. FIG. 6 illustrates a communication procedure focusing upon particular seat terminal 14(S). Steps S1 to S8 in FIG. 5 correspond to processing (1) to (8) in FIG. 6.

The processing illustrated in FIGS. 5 and 6 is performed to pair BT device 12 lent from the airline company to the user who is a passenger of the airplane, and seat terminal 14 corresponding to the user's seat. The user installs an application which is provided by the airline company and is used for pairing, in advance in portable terminal 10 which the user possesses. Further, after boarding, the user activates the application near the user's seat, and selects, for example, processing of "start pairing". Thus, the processing illustrated in FIGS. 5 and 6 is started.

Now, reference is made to FIG. 5.

In step S1, CPU 201 of portable terminal 10 transmits a connection request through wireless communication circuit 204. This connection request is received by wireless communication circuit 304 of BT device 12.

In step S2, CPU 301 of BT device 12 sends a pass key request to portable terminal 10. This pass key means a pass key of a terminal (seat terminal 14(S)) which BT device 12 needs to be connected with.

In step S3, CPU 201 of portable terminal 10 transmits a pass key request. The pass key request is received by a plurality of surrounding seat terminals 14 in a communicable range.

In step S4, each of seat terminals 14 transmits the pass key of each seat terminal 14 to portable terminal 10. CPU 201 of portable terminal 10 holds in memory 202 the pass key received from each seat terminal 14.

In step S5, CPU 201 of portable terminal 10 cross-checks a plurality of received pass keys and identification information held in memory 202, and identifies that the pass key of seat terminal 14(S) is included in a plurality of received pass keys. Specific content of the processing will be described later with reference to FIG. 6.

In step S6, CPU 201 of portable terminal 10 transmits the pass key of seat terminal 14(S) to BT device 12. Thus, CPU 301 of BT device 12 can obtain the pass key of connection target seat terminal 14(S).

In step S7*a*, CPU 301 of BT device 12 transmits the pass key of BT device 12 to seat terminal 14(S) corresponding to the received pass key.

In step S7*b*, seat terminal 14(S) receives the pass key of BT device 12.

In step S8, BT device 12 and seat terminal 14(S) hold the mutual pass keys, and then are paired.

Next, reference is made to FIG. 6. As described above, FIG. 6 corresponds to the processing in FIG. 5 focusing upon particular seat terminal 14(S). Accordingly, entire processing will not be described, and different processing (3) to (6) from normal pairing connection processing according to the Bluetooth standards will be described below.

According to the existing Bluetooth standards, as a result that seat terminal 14(S) transmits the connection request to portable terminal 10, seat terminal 14(S) receives the pass key request from portable terminal 10.

However, in processing (3), seat terminal 14(S) receives the pass key request from portable terminal 10 even though seat terminal 14(S) does not send the connection request to portable terminal 10. That is, seat terminal 14(S) is in a state where seat terminal 14(S) can receive pass key requests at all times. Further, in response to reception of the pass key request, seat terminal 14(S) transmits the pass key of seat terminal 14(S) to portable terminal 10.

CPU 201 of portable terminal 10 which has received the pass key of seat terminal 14(S) specifies the pass key of seat terminal 14(S) corresponding to the user's seat from user's seat position information by referring to identification information. Further, CPU 201 cross-checks the specified pass key and the received pass key of each seat terminal 14, and determines whether the pass keys match or do not match. The matching pass key is the pass key transmitted from seat terminal 14(S), and the unmatching pass key is a pass key transmitted from another seat terminal 14. Consequently, it is possible to specify the pass key of seat terminal 14(S) corresponding to the user's seat.

It should be noted that, in the present exemplary embodiment, it is assumed that the seat position information is a number of a seat at which the user sits, and is held in portable terminal 10 in advance. In recent years, it is becoming accepted that users finish a boarding process using smartphones or the like. For example, when the application of portable terminal 10 also has a function of enabling a reservation process and a boarding process of an airplane, it is possible to hold seat position information of users. Even when such a function is not provided, a user may input user's seat position information to this application in advance. That is, portable terminal 10 only needs to accept seat position information indicating a user's seat position in advance.

CPU 201 of portable terminal 10 transmits the pass key of seat terminal 14(S) to BT device 12 (processing (6)). Subsequently, after processing in steps S7*a* and S7*b* in FIG. 5 corresponding to processing (7) in FIG. 6, and processing in step S8 in FIG. 5 corresponding to processing (8) in FIG. 6, pairing is established.

It should be noted that, another processing may be further added between processing (7) and processing (8) in FIG. 6. For example, a message (e.g. "Do you want to connect to a Bluetooth headphone?") indicating that BT device 12 and seat terminal 14(S) are connected may be output to display 409 of seat terminal 14(S). Further, after user's approval is obtained through an input apparatus (e.g. the touch screen panel and the buttons) of seat terminal 14(S), pairing between BT device 12 and seat terminal 14(S) in processing (8) may be established.

[1-3. Effect and Others]

As described above, in the present exemplary embodiment, the description has been given of wireless communication system 100 including the first electronic device (portable terminal 10), the second electronic device (BT device 12), and a plurality of third electronic devices (seat terminals 14), the devices each having a wireless communication function. Portable terminal 10 is used to pair BT device 12 and particular seat terminal 14(S). Each of a plurality of seat terminals 14 holds a pass key for uniquely specifying each of a plurality of seat terminals 14.

Portable terminal 10 includes memory 202 which holds identification information (Table 1) for identifying seat terminal 14(S) to pair with portable terminal 10, wireless communication circuit 204 which receives pass keys from part or all of a plurality of seat terminals 14, and CPU 201 which identifies that the pass key of seat terminal 14(S) is included in a plurality of pass keys. Wireless communication circuit 204 transmits the pass key of seat terminal 14(S) to BT device 12.

Focusing upon seat terminal 14(S), seat terminal 14(S) includes memory 402 which holds the pass key for uniquely specifying seat terminal 14(S), wireless communication circuit 404 which transmits the pass key held in memory 402, to portable terminal 10, wireless communication circuit 404 which, when portable terminal 10 transfers the pass key to BT device 12, receives the pass key of BT device 12, from BT device 12 which has responded to the transfer, and CPU 401 which establishes connection between BT device 12 and seat terminal 14(S).

The user does not need to input the pass key of seat terminal 14(S) and the pass key of BT device 12 for which pairing needs to be established. Consequently, it is possible to reduce a burden on a user.

2. Other Exemplary Embodiments

As described above, the exemplary embodiment has been described as an exemplary technique disclosed in the exemplary embodiment of the present disclosure. However, the technique according to the exemplary embodiment of the present disclosure is not limited to this, and is also applicable to exemplary embodiments in which modifications, replacements, additions, omission, and the like are performed. Further, components described in the exemplary embodiment can also be combined to provide new exemplary embodiments.

Other exemplary embodiments will be described below.

2.1. Modification Related to Identification Information

In the exemplary embodiment, as illustrated in Table 1, the description has been given of an example where a table which associates a seat number which is seat position information with a pass key of each seat terminal 14 is used as identification information.

As identification information for more specifically specifying an airplane, the seat position information may further include a flight number in addition to seat numbers. Alternatively, the seat position information may further include time information typically such as a departure/arrival scheduled date of a boarding date and an arrival date. Further, the seat position information may further include attribute information as to whether or not a user has subscribed to a particular service related to music playback, video playback and games during boarding. When, for example, in-plane broadcast for all passengers or free broadcast is available, conditions that communication is limited to particular data communication may be added as attribute information to identification information. Further, in response to a change of conditions that a time when a program a user has subscribed to view is broadcast in the airplane comes, pairing may be performed again even though pairing has been performed so far. By this means, profiles which perform communication based on the Bluetooth standards may be changed.

The time information and/or attribute information are desirably provided additionally to the seat position information.

It should be noted that, a modification of a processing procedure and content of identification information described so far is likewise applicable to various modifications described below.

2.2. Modification Related to Pairing Procedure

Figure 7:
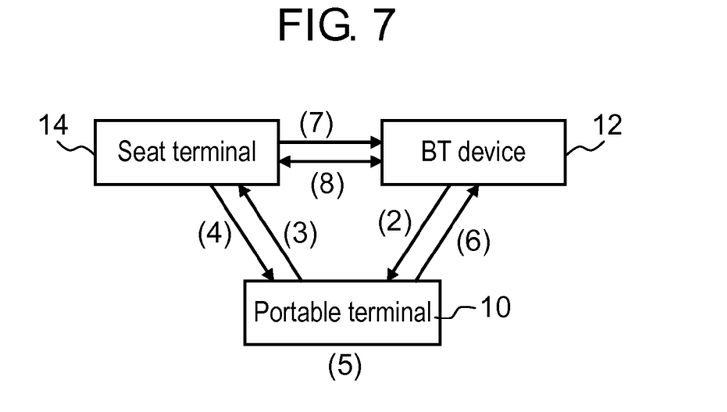
FIG. 7 illustrates a first modification of a pairing procedure.
Figure 8:
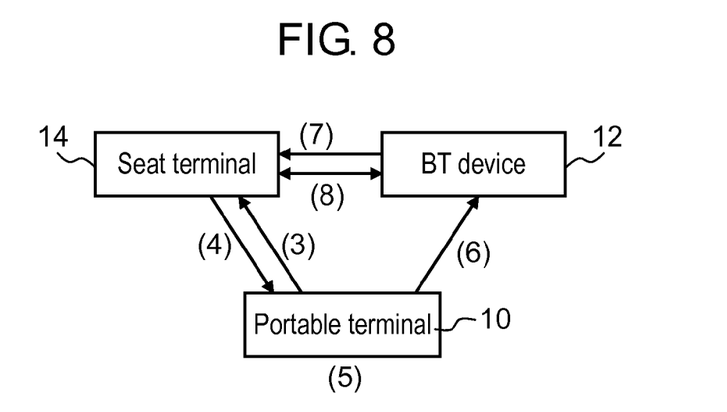
FIG. 8 illustrates a second modification of a pairing procedure.
Figure 9:
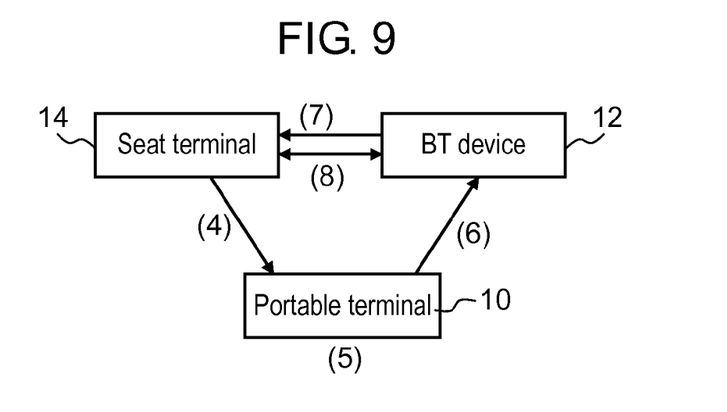
FIG. 9 illustrates a third modification of a pairing procedure.

The modification of the pairing procedure illustrated in FIGS. 5 and 6 will be described with reference to FIGS. 7 and to 9. In FIGS. 7 to 9, part of the pairing procedure illustrated in FIGS. 5 and 6 is not illustrated. It should be noted that, numbers in parentheses in FIGS. 7 to 9 correspond to the processing in FIG. 6.

FIG. 7 illustrates a first modification of a pairing procedure.

In this modification, processing (1) of requesting connection from portable terminal 10 to BT device 12 is omitted. This means that, when, for example, BT device 12 is powered on, BT device 12 immediately requests a pass key. The processing in FIG. 7 is started when, for example, a user activates an application of BT device 12 near a user's seat after boarding, and performs an operation (hereinafter, referred to as a "pairing start operation") of selecting processing of "start pairing", for example, and powers up BT device 12.

FIG. 8 illustrates a second modification of the pairing procedure.

In this modification, processing (1) of requesting connection from portable terminal 10 to BT device 12 and processing (2) of requesting a pass key from BT device 12 to portable terminal 10 are omitted. Typically, a case where BT device 12 has already been paired with portable terminal 10, and portable terminal 10 and BT device 12 do not need to communicate in advance is assumed. This is preferable when, for example, the user carries onboard paired BT device 12 (headphone) which the user possesses, and enjoys music using seat terminal 14 by using this BT device 12.

Portable terminal 10 first performs processing (3) of requesting pass keys to surrounding seat terminals 14. The processing in FIG. 8 is started when, for example, the user performs the pairing start operation.

FIG. 9 illustrates a third modification of the pairing procedure.

In this modification, processing (1) to (3) is omitted, and processing starts from processing (4) of transmitting a pass key from each seat terminal 14. That is, this means that each seat terminal 14 continues transmitting a pass key on a regular basis or at random. Once pairing between seat terminal 14 and BT device 12 is established, this seat terminal 14 stops transmitting the pass key.

Similar to the second modification, this modification is preferable in the case where BT device 12 has already been paired with portable terminal 10, and portable terminal 10 and BT device 12 do not need to communicate in advance.

2.3. Modification Related to Selection of BT Device

The exemplary embodiment assumes that a number of BT device 12 is one. However, there are a plurality of BT devices 12 in surroundings, for example in some cases. Further, a user possesses a plurality of BT devices 12 in some cases.

Figure 10:
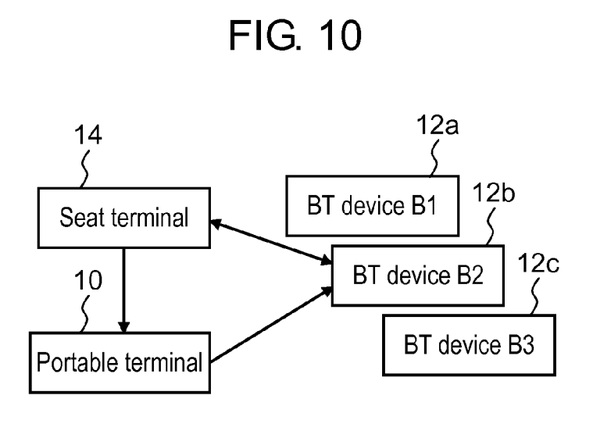
FIG. 10 illustrates an example where a user selects one from among a plurality of BT devices 12a to 12c, and realizes pairing.

FIG. 10 illustrates an example where the user selects one of a plurality of BT devices 12a to 12c, and realizes pairing. When there are a plurality of BT devices 12, the user needs to select which BT device 12 to pair with seat terminal 14. The user can perform selection using, for example, a user interface of an application of portable terminal 10.

Figure 11:
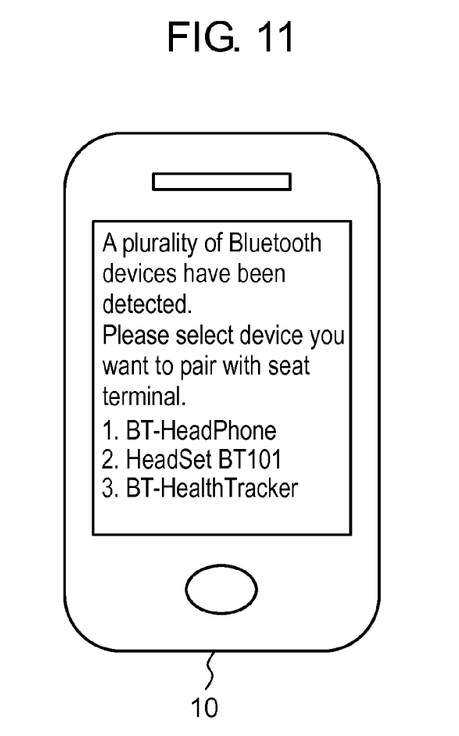
FIG. 11 illustrates selection items of a plurality of BT devices displayed on a screen of portable terminal 10.

FIG. 11 illustrates selection items of a plurality of BT devices displayed on a screen of portable terminal 10. As the selection items, a name of a BT device which has already been paired with portable terminal 10, and surrounding BT device names are listed. For example, the user can pair BT device 12b (FIG. 10) corresponding to item 1 and seat terminal 14 by selecting item 1.

2.4. Modification Related to Connection Mode

The exemplary embodiment has assumed that portable terminal 10 takes on processing up to establishment of pairing, and, after pairing is established, BT device 12 and seat terminal 14 perform communication. However, portable terminal 10 can involve in communication between BT device 12 and seat terminal 14.

Figure 12:
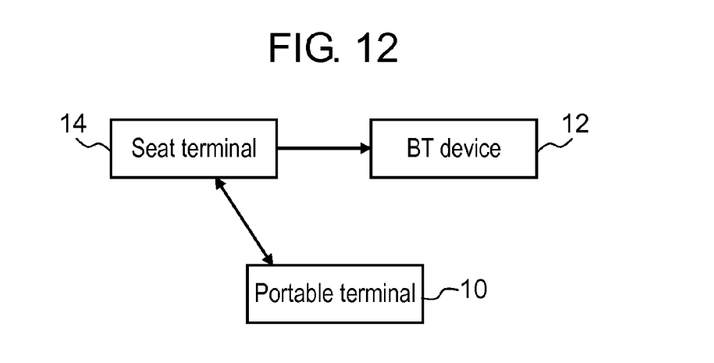
FIG. 12 illustrates an example where seat terminal 14 is paired with BT device 12 and is also paired with portable terminal 10.

FIG. 12 illustrates an example where seat terminal 14 is paired with BT device 12 and is also paired with portable terminal 10. Portable terminal 14 functions as a host in relation to BT device 12, and functions as a slave in relation to portable terminal 10. Hence, a timing at which seat terminal 14 and BT device 12 are paired, and a timing at which seat terminal 14 and portable terminal 10 are paired are independent from each other. Seat terminal 14 may be paired with portable terminal 10 before, after, or simultaneously processing of pairing seat terminal 14 and BT device 12.

There are various advantages brought by adopting a connection mode illustrated in FIG. 12. For example, it is assumed that after BT device 12 and seat terminal 14 are paired, a user selects a music name the user desires from a plurality of music names displayed on display 409 of seat terminal 14. In this case, the user can select music by operating buttons provided to seat terminal 14. Then, it would be more convenient for the user if the same music names as those on display 409 of seat terminal 14 are displayed on an interface of an application executed by portable terminal 10 of the user, and the user can select one of the music names using portable terminal 10.

It should be noted that, an indication of display 209 of portable terminal 10 and an indication of display 409 of seat terminal 14 do not need to match. For example, relatively simple content may be displayed on display 409 of seat terminal 14, and relatively ample content may be displayed on display 209 of portable terminal 10. It is possible to improve user's convenience as long as seat terminal 14 is controlled using portable terminal 10.

Figure 13:
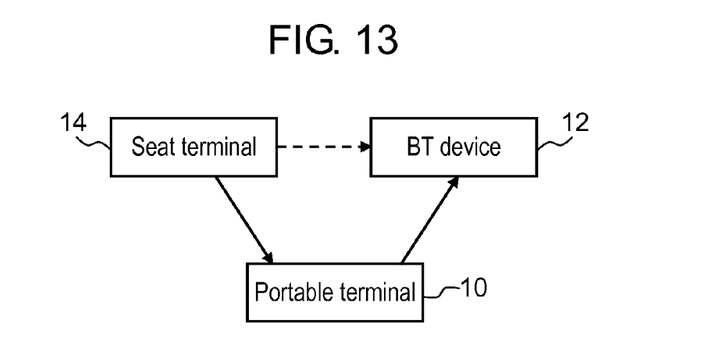
FIG. 13 illustrates an example where portable terminal 10 relays communication between seat terminal 14 and BT device 12.

FIG. 13 illustrates an example where portable terminal 10 relays communication between seat terminal 14 and BT device 12.

For example, audio data is transmitted from seat terminal 14 to BT device 12 as indicated by a broken line in FIG. 13, and display data and control data are transmitted from seat terminal 14 to portable terminal 10, and are transmitted from portable terminal 10 to BT device 12. Generally, a display is not provided to a headphone. Hence, significance to transmit image data and text data to BT device 12 which is a headphone is poor. However, by transmitting display data or control data from seat terminal 14 to portable terminal 10, the user can easily check a currently played back music name, a past playback history, and the like on display 209 of portable terminal 10.

It should be noted that, according to the configuration in FIG. 13, portable terminal 10 can also receive control data from BT device 12. Hence, portable terminal 10 may receive, for example, information such as information about a remaining battery of BT device 12, and display this information on display 209.

Figure 14A:
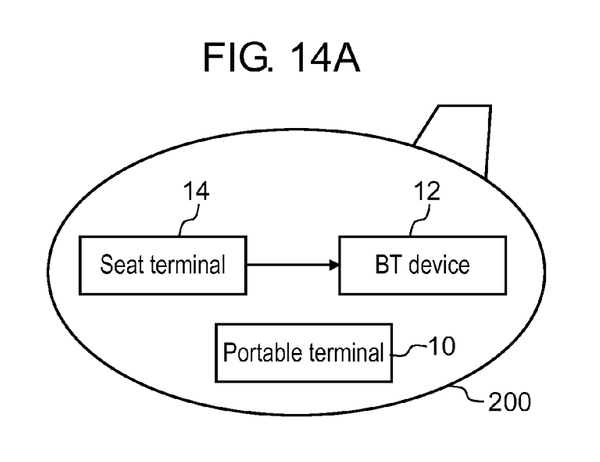
FIG. 14A illustrates a situation that pairing between BT device 12 and seat terminal 14 is established in airplane 200.

FIG. 14A illustrates a situation that BT device 12 and seat terminal 14 are paired in airplane 200. When the user leaves seat terminal 14 and gets off from airplane 200 after boarding, connection between BT device 12 and seat terminal 14 is cut. Under such a situation, portable terminal 10 establishes pairing with BT device 12.

Figure 14B:
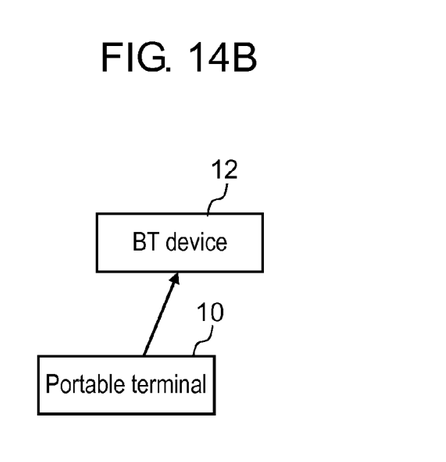
FIG. 14B illustrates portable terminal 10 paired with BT device 12.

FIG. 14B illustrates portable terminal 10 paired with BT device 12. When the user carries user's portable terminal 10 and BT device 12 in the airplane and portable terminal 10 and BT device 12 are already paired, information for recognizing portable terminal 10 and BT device 12 has already been stored in both of portable terminal 10 and BT device 12. Hence, when the connection between BT device 12 and seat terminal 14 is cut, BT device 12 automatically establishes pairing with portable terminal 10 as illustrated in FIG. 14B.

An operation in the case where portable terminal 10 and BT device 12 have not been paired will be described below.

There are portable terminals and BT devices of other users who finished boarding in the surroundings, and therefore pairing other portable terminals and BT devices at random is not appropriate. Pairing targets are portable terminal 10 and BT device 12 used to pair seat terminal 14 and BT device 12 in the airplane.

That is, portable terminal 10 holds in memory 202 information (e.g. pass key) for specifying BT device 12 paired with seat terminal 14. Portable terminal 10 only needs to establish pairing with BT device 12 using this pass key and a pass key of portable terminal 10.

The exemplary embodiment of the present disclosure is widely applicable to portable terminals, seat terminals and the like which are used for pairing when a particular seat terminal and a device are connected (paired) to enable communication between the particular seat terminal and the device under a situation that there are a plurality of seat terminals as in, for example, an airplane.

What is claimed is:

1. A pairing method of, in a wireless communication system which comprises a first electronic device, a second electronic device, and a plurality of third electronic devices, pairing the second electronic device and a particular one of the third electronic devices,
   the devices each having a wireless communication function,
   the first electronic device holding identification information for identifying the particular third electronic device, and
   the second electronic device and each of the third electronic devices holding pass keys for uniquely specifying the second electronic device and each of the third electronic devices,
   the pairing method comprising:
   a step (a) in which the first electronic device receives a plurality of pass keys from part or all of the plurality of third electronic devices;
   a step (b) in which the first electronic device identifies that a pass key of the particular third electronic device is included in the plurality of pass keys, using the identification information;
   a step (c) of transmitting the pass key of the particular third electronic device to the second electronic device;
   a step (d) in which the second electronic device transmits the pass key of the second electronic device to the particular third electronic device; and
   a step (e) of establishing connection between the second electronic device and the particular third electronic device.

2. The pairing method according to claim 1, further comprising a step (f) in which the first electronic device requests each of the plurality of third electronic devices to transmit the pass key, the step (f) being performed before the step (a).

3. The pairing method according to claim 2, further comprising a step (g) in which the second electronic device requests the first electronic device to transmit the pass key of the particular third electronic device, the step (g) being performed before the step (f).

4. The pairing method according to claim 3, further comprising a step (h) of in which the first electronic device requests connection of the second electronic device, the step (h) being performed before the step (g).

5. The pairing method according to claim 1, further comprising a step (i) of outputting a message indicating that the second electronic device and the particular third electronic device are connected, the step (i) being performed before the step (d) and the step (e).

6. The pairing method according to claim 1, wherein the identification information for identifying the particular third electronic device includes the pass key of the particular third electronic device.

7. The pairing method according to claim 1, wherein the identification information for identifying the particular third electronic device is a table which associates the pass key of the particular third electronic device with information of a position at which the particular third electronic device is disposed.

8. The pairing method according to claim 1, wherein the plurality of third electronic devices are electronic devices provided respectively in association with seats in an airplane, the first electronic device holds, as the identification information in advance, a table which associates each of the seats in the airplane with the pass key of each of the third electronic devices provided at each of the seats, the step (b) includes, a step (b1) of receiving position information indicating a particular seat position of the airplane, a step (b2) of specifying the pass key of each of the third electronic devices by referring to the table based on the position information, and a step (b3) of identifying that the pass key specified in the step (b2) is included in the plurality of pass keys.

9. The pairing method according to claim 8, wherein the first electronic device holds, as the identification information in advance, a table which associates a seat number of each of the seats in the airplane with the pass key of each of the third electronic devices provided at each of the seats.

10. The pairing method according to claim 9, wherein the table includes a seat number of each of the seats in the airplane specified using at least one of a flight number, a departure date, and an arrival date.

11. The pairing method according to claim 8, wherein the first electronic device holds, as the identification information in advance, a table in which a seat number of each of the seats in the airplane, the pass key of each of the third electronic devices provided at each of the seats, and attribute information which is a use condition of the particular third electronic device, are associated with each other.

12. The pairing method according to claim 11, wherein the use condition is a condition related to use of content using each of the third electronic devices.

13. A portable terminal apparatus which is used to, in a wireless communication system which comprises a first electronic device, a second electronic device, and a plurality of third electronic devices, pair the second electronic device and a particular one of the third electronic devices, and the portable terminal apparatus is the first electronic device, the devices each having a wireless communication function, and each of the third electronic devices holding a pass key for uniquely specifying each of the third electronic devices, the portable terminal apparatus comprising:

a storage medium which holds identification information for identifying the particular third electronic device;

a reception circuit which receives a plurality of pass keys from part or all of the plurality of third electronic devices;

an arithmetic circuit which identifies that a pass key of the particular third electronic device is included in the plurality of pass keys, using the identification information; and a transmission circuit which transmits the pass key of the particular third electronic device to the second electronic device.

14. A terminal apparatus which configures a wireless communication system along with a first electronic device and a second electronic device, the devices each having a wireless communication function, the first electronic device holding identification information for identifying the particular third electronic device, and the second electronic device holding a pass key for uniquely specifying the second electronic device, the terminal apparatus comprising:

a storage medium which holds a pass key for uniquely specifying the terminal apparatus;

a transmission circuit which transmits the pass key, held in the storage medium, to the first electronic device;

a reception circuit which, when the first electronic device transfers the pass key to the second electronic device, receives the pass key of the second electronic device from the second electronic device which has responded to the transfer; and a control circuit which establishes connection with the second electronic device.

* * * * *